(12) United States Patent
Clark et al.

(10) Patent No.: US 11,774,011 B2
(45) Date of Patent: Oct. 3, 2023

(54) NON CONDUCTIVE RUBBER HOSE

(71) Applicant: Danfoss A/S, Nordborg (DE)

(72) Inventors: Aaron David Clark, Lambertville, MI (US); Gina Theresa Clark, Lambertville, MI (US); Doris Ann Showalter, Bowling Green, OH (US); Chad Christopher Borton, Napoleon, OH (US)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 17/714,702

(22) Filed: Apr. 6, 2022

(65) Prior Publication Data

US 2022/0228679 A1 Jul. 21, 2022

Related U.S. Application Data

(62) Division of application No. 15/892,985, filed on Feb. 9, 2018, now Pat. No. 11,300,232.

(Continued)

(51) Int. Cl.
*B29C 48/21* (2019.01)
*F16L 11/12* (2006.01)
(Continued)

(52) U.S. Cl.
CPC .............. *F16L 11/12* (2013.01); *B29C 48/21* (2019.02); *B32B 1/00* (2013.01); *B32B 1/08* (2013.01);
(Continued)

(58) Field of Classification Search
CPC .......... B29C 48/10; B29C 48/21; C08J 5/046; C08K 2003/2241; C08K 3/04; C08K 3/22; C08K 3/34; C08K 3/346; C08K 3/36; C08K 5/12; C08K 9/06; C08L 2205/025; C08L 23/16; C08L 9/00; B29K 2023/06; B29K 2023/16; B29K 2105/0032; B29K 2105/0038; B29K 2105/0044; B29K 2509/08; B29K 2511/00; B29K 2995/0007; B29K 2995/007; B29K 2995/0077; Y10T 428/139; Y10T 428/1397; B32B 1/00; B32B 1/08; B32B 2250/03;
(Continued)

(56) References Cited

U.S. PATENT DOCUMENTS 4,277,673 A 7/1981 Kelly
5,565,275 A 10/1996 Schmidt et al.
(Continued)

FOREIGN PATENT DOCUMENTS

EP 1090743 4/2001
WO 93/21270 10/1993
(Continued)

OTHER PUBLICATIONS

Antioxidant DQ technical data sheet, Akrochem, 2010, 1 page total.
(Continued)

*Primary Examiner* — Yan Lan
(74) *Attorney, Agent, or Firm* — Merchant and Gould, PC

(57) ABSTRACT

A non-conductive rubber hose is provided exhibiting lower conductivity compared to conventional EPDM hose, and reduced stiffness compared to conventional non-conductive thermoplastic hose. The hose is useful for applications such as in hydraulics for boom trucks, and for coolant in plasma cutting tools.

17 Claims, 3 Drawing Sheets

Related U.S. Application Data

(60) Provisional application No. 62/457,651, filed on Feb. 10, 2017.

(51) Int. Cl.

| | | |
|---|---|---|
| *F16L 11/08* | (2006.01) | |
| *B32B 1/00* | (2006.01) | |
| *C08L 23/16* | (2006.01) | |
| *B32B 1/08* | (2006.01) | |
| *C08J 5/04* | (2006.01) | |
| *C08K 3/22* | (2006.01) | |
| *C08K 3/34* | (2006.01) | |
| *C08K 3/36* | (2006.01) | |
| *C08L 9/00* | (2006.01) | |
| *B32B 5/02* | (2006.01) | |
| *B32B 25/08* | (2006.01) | |
| *B32B 25/10* | (2006.01) | |
| *B32B 25/14* | (2006.01) | |
| *C08K 5/12* | (2006.01) | |
| *B29C 48/10* | (2019.01) | |
| *B29K 23/00* | (2006.01) | |
| *B29K 105/00* | (2006.01) | |
| *B29K 509/08* | (2006.01) | |
| *B29K 511/00* | (2006.01) | |

(52) U.S. Cl.
CPC ............. *B32B 5/024* (2013.01); *B32B 25/08* (2013.01); *B32B 25/10* (2013.01); *B32B 25/14* (2013.01); *C08J 5/046* (2013.01); *C08K 3/22* (2013.01); *C08K 3/346* (2013.01); *C08K 3/36* (2013.01); *C08K 5/12* (2013.01); *C08L 9/00* (2013.01); *C08L 23/16* (2013.01); *F16L 11/085* (2013.01); *B29C 48/10* (2019.02); *B29K 2023/06* (2013.01); *B29K 2023/16* (2013.01); *B29K 2105/0032* (2013.01); *B29K 2105/0038* (2013.01); *B29K 2105/0044* (2013.01); *B29K 2509/08* (2013.01); *B29K 2511/00* (2013.01); *B29K 2995/0007* (2013.01); *B29K 2995/007* (2013.01); *B29K 2995/0077* (2013.01); *B32B 2307/206* (2013.01); *B32B 2307/536* (2013.01); *B32B 2307/54* (2013.01); *C08K 2003/2241* (2013.01); *C08L 2205/025* (2013.01); *Y10T 428/139* (2015.01); *Y10T 428/1397* (2015.01)

(58) Field of Classification Search
CPC .... B32B 2262/0261; B32B 2262/0269; B32B 2262/0276; B32B 2262/04; B32B 2262/062; B32B 2264/10; B32B 2264/102; B32B 2264/108; B32B 2307/204; B32B 2307/206; B32B 2307/536; B32B 2307/54; B32B 25/02; B32B 25/08; B32B 25/10; B32B 25/14; B32B 2597/00; B32B 27/12; B32B 27/322; B32B 5/024
See application file for complete search history.

(56) References Cited

U.S. PATENT DOCUMENTS

| | | |
|---|---|---|
| 6,180,703 B1 | 1/2001 | Onoi et al. |
| 6,372,349 B1 | 4/2002 | Hisashi et al. |
| 7,228,877 B2 | 6/2007 | Schifman |
| 9,139,727 B2 | 3/2015 | Tang et al. |
| 2003/0194522 A1 | 10/2003 | Kurimoto et al. |
| 2007/0244244 A1 | 1/2007 | Bertoux et al. |
| 2013/0273468 A1 | 10/2013 | Korchev et al. |
| 2014/0371369 A1 | 12/2014 | Kurimoto et al. |
| 2015/0275053 A1 | 10/2015 | Iwase et al. |
| 2016/0152796 A1 | 6/2016 | Beelen et al. |

FOREIGN PATENT DOCUMENTS

| | | |
|---|---|---|
| WO | 2006/128646 | 12/2006 |
| WO | 2012/133385 | 10/2012 |

OTHER PUBLICATIONS

Performance Rubber & Additives, Biesterfeld Performance Rubber, 13 pages total.
Buna ® EP, Ethylene Propylene Rubber, The Versatile Elsatomer, LANXESS, May 2007, 24 pages total.
"Insights on Carbon Black Fundamentals", Modern Dispersions, Inc., 2006, 8 pages total.
D2414, Standard Test Method for Carbon Black—Oil Absorption No. ASTM International, 2004, 6 pages total.
Spheron ® 6400A carbon black product data sheet, Cabot, 2014, 2 pages.
Elastomag ® 100 High Surface Area Specialty Grade Magnesium Oxide, Martin Marietta Magnesia Specialties, 2015, 1 page total.
Elastomag ® 170 High Surface Area Specialty Grade Magnesium Oxide, Martin Marietta Magnesia Specialties, 2015, 1 page total.
DHT-4A-2 Material Safety Data Sheets, Kyowa Chemical Industry Co., Ltd., 2014, 6 pagers total.
Kadox ® 930 Zinc Oxide series, Horsehead Corporation, 2007, 1 page total.
Nulok ® 390 Treated Kaolin Clay, KaMin Performance Minerals, 2008, 1 page total.
Product Data, VUL-CUP ® 40KE Organic Peroxide, Vulcanizing Agent and Crosslinking Agent, GEO Specialty Chemicals, 2001,4 pages total.
Santoprene ® 121-79 W233 Thermoplastic Rubber, Advanced Elastomer Systems, 1 page total.
Spheron ® 6400 Carbon Black, Cabot Corporation, 2003, 3 pages total.
Spheron ® 6400 carbon black product data sheet, Cabot Corporation, 2014, 2 pages total.
Technical Data Sheet, Deolink VO, King Industries, Inc., 2011, 1 page total.
TiONA® AT-1 product data sheet, Cristal, 2017, 1 page total.
Vistalon 7602, Ethylene Propylene Diene Terpolymer Rubber, ExxonMobil Chemical, 2012, 1 page total.
Vistalon 8600, Ethylene Propylene Diene Terpolymer Rubber, ExxonMobil Chemical, 2012, 1 page total.
Vistalon 8800, Ethylene Propylene Diene Terpolymer Rubber, ExxonMobil Chemical, 2012.
Vistalon 7001, Ethylene Propylene Diene Terpolymer Rubber, ExxonMobil, 2016, 1 page total.
Vistalon 7602, Ethylene Propylene Diene Terpolymer Rubber, ExxonMobil, 2016, 1 page total.
Extended European Search Report for Application No. 18156192.9 dated Jun. 5, 2018.

NON CONDUCTIVE RUBBER HOSE

CROSS REFERENCE TO RELATED APPLICATIONS

This application is a divisional application of U.S. application Ser. No. 15/892,985, filed Feb. 9, 2018, now U.S. Pat. No. 11,300,232 issued on Apr. 12, 2022, which claims the benefit of U.S. Provisional Application No. 62/457,651, filed Feb. 10, 2017, the disclosures of each of which are herein incorporated by reference in their entireties.

BACKGROUND

High dielectric strength (low electrically conductive) hoses for use in boom truck hydraulics and for plasma cutting tools have traditionally been non-conductive thermoplastic hoses. However, thermoplastic hoses tend to be stiff, prone to kinking and high cost.

US 2007/0244244 describes a low oligomer conductive polyamide thermoplastic hose comprising a layer having a polyamide and an antistatic agent such as a carbon black, carbon fibers, or carbon nanotubes. The hose is used for fuel hoses or tubing for internal combustion engines. A low precipitate polyamide is employed to reduce the level of low molecular weight polyamide which may be released from the hose after exposure to fuel.

EP 1090743 A2 describes an electrochemical degradation resistant coolant hose having a thermoplastic vulcanizate inner layer and an EPDM rubber outer cover layer that is sulfur cured. The presence of carbon black in radiator hose is said to increase current carried by the coolant, with the current rapidly increasing as the carbon black loading is increased. Accordingly as the current increases the rubber hose, acting as cathode, increases in weight as it deteriorates and absorbs fluid. For example, in one series of tests, fluid absorption in EPDM rubber was shown to be positively related to increase in voltage.

Unfortunately, use of polyamides and other thermoplastic polymers can result in undesirable stiffness. A non-conductive hose comprising an inner layer which provides a more flexible, kink resistant solution is desirable.

An EPDM rubber hose is provided exhibiting lower conductivity compared to conventional EPDM hose, and reduced stiffness compared to conventional non-conductive thermoplastic hose.

SUMMARY

In some embodiments, an EPDM (Ethylene Propylene Diene Monomer) hose is provided exhibiting lower conductivity compared to conventional EPDM hose, and reduced stiffness and higher 100% modulus compared to prior art non-conductive thermoplastic hose.

A rubber hose is provided comprising a hose body comprising at least one layer formed from a first composition comprising an EPDM polymer; and a resistive filler. In some embodiments, the first composition further comprises a filler activator.

In some embodiments, a rubber hose is provided that is capable of meeting the performance requirements of IEC 60974-7 (Torch standard), or wherein the hose passes the insulation resistance and Hipot test to 30 kV peak for 1 minute by exhibiting no dielectric breakdown.

In some embodiments, the first composition comprises a weight ratio of the resistive filler to the filler activator from about 100:1 to about 5:1. In some embodiments, the first composition further comprises a silane-treated filler and an additional filler. In some embodiments, the weight ratio of silane-treated filler to additional filler is from about 1:10-10:1. In some embodiments, the EPDM polymer in the first composition comprises low ethylene EPDM polymer and high ethylene EPDM polymer in a weight ratio of about 10:1 to about 1:1.

In some embodiments, a non-conductive hose is provided comprising a reinforcement layer. In some embodiments, the reinforcement layer is made up of parallel members, mesh or braid. In some embodiments, the reinforcement layer is a sleeve surrounding the EPDM rubber layer. In some embodiments, the reinforcement layer is a discontinuous layer comprising interstices, such as a textile braid, wherein the textile is selected from the group consisting of aramid, rayon, nylon, cotton, and polyester.

In some embodiments, a non-conductive rubber hose is provided comprising a cover layer prepared from a second composition. In some embodiments, the second composition comprises one or more chlorinated polyethylene polymers.

In some embodiments, a rubber hose is provided comprising a hose body comprising at least one layer formed from a first composition comprising an EPDM polymer at 90-100 Pph; a resistive filler at 30-60 Phr; a filler activator at 0.1-10 Phr; a silane-treated filler at 10-30 Phr; and an additional filler at 20-80 Phr. In some embodiments, the first composition further comprises each of a peroxide donor curative, a plasticizer, and an antioxidant. In some embodiments, the first composition does not contain a sulfur curative. In some embodiments, the rubber hose is not sulfur cured to avoid galvanic corrosion.

In some embodiments, a rubber hose is provided comprising at least one layer prepared from a first composition further comprising one or more of the group consisting of process aid, acid scavenger, paraffin wax, and zinc activator.

In some embodiments, a rubber hose is provided comprising a rubber tube layer, and a reinforcing layer.

In some embodiments, a rubber hose is provided comprising a rubber tube layer, a reinforcing layer, and a cover layer prepared from a second composition comprising chloropolyethylene (CPE).

In some embodiments, a rubber hose is provided comprising a rubber tube layer, prepared from a first EPDM composition, the cured first EPDM composition exhibits one or more physical parameters selected from the group consisting of Tensile strength of 2000-2500 psi when tested according to ASTM D412; Percent elongation of 275-350% when tested according to ASTM D412; 100% Modulus of from 800-1000 psi when tested according to ASTM D412; and Shore A Hardness of from 75-80 pts when tested according to ASTM D2240.

In some embodiments, a non-conductive rubber hose is provided that exhibits a minimum burst pressure of 1000 psi or higher, 1200 psi or higher, 1300 psi or higher, 1400 psi or higher, 1500 psi or higher, or 1600 psi or higher.

In some embodiments, a non-conductive rubber hose comprising at least one layer prepared from a polymer composition that following cure exhibits 100% modulus of greater than 600 psi, greater than 700 psi, or from 800 to 1000 psi when tested in accordance with ASTM 412 is provided.

In some embodiments, a method of making a non-conductive rubber hose is provided comprising blending a first composition comprising an ethylene propylene diene monomer (EPDM), a resistive filler, and a silane-coated filler; extruding the first composition onto a mandrel to form an EPDM layer; applying a textile braid over the EPDM tube layer to form reinforcement layer; extruding a second composition over the reinforcement layer to form a cover layer in a green hose; vulcanizing the green hose; and expelling the hose from the mandrel. In some embodiments, the first composition comprises a low ethylene EPDM polymer and a high ethylene EPDM polymer in a weight ratio of about 10:1 to about 1:1. In some embodiments, a non-conductive rubber hose is provided that passes the dielectric strength test according to IEC 60974-7 (torch standard), and wherein the coolant hose passes the insulation resistance and Hipot test to 30 kV peak for 1 minute.

In some embodiments, the non-conductive rubber hose carries a coolant, for example, an alkylene glycol. In some embodiments, the alkylene glycol may be selected from ethylene glycol or propylene glycol. In some embodiments, the non-conductive rubber hose carries a hydraulic fluid, for example, a non-conductive hydraulic fluid such as an aviation grade non-conductive hydraulic fluid.

In one embodiment, a non-conductive rubber hose is provided comprising at least one layer comprising a non-conductive rubber tube layer prepared from an EPDM rubber tube composition comprising one or more ethylene propylene diene monomer (EPDM) polymers, and a resistive filler, wherein the resistive filler is a carbon black having low surface area of from about 16-27 mg/g, or no more than 20 mg/g Iodine adsorption by ASTM D 1510. In some embodiments, the resistive filler is a carbon black having low surface area of from about 16-27 mg/g Iodine adsorption by ASTM D 1510 and medium to high structure of from 92-120 DBP cm3/100 g as determined by absorption of dibutylphthalate (DBP) by ASTM 2414-90.

DETAILED DESCRIPTION

Figure 1:
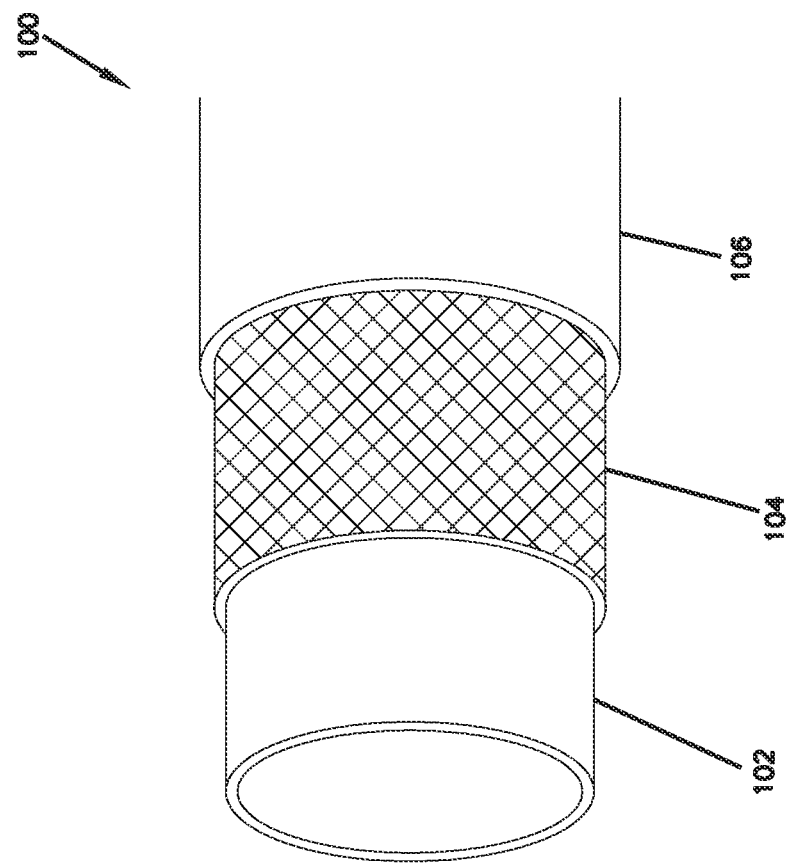
FIG. 1 shows a schematic of one embodiment of the non-conductive rubber hose 100 comprising three layers: an inner resistive rubber tube layer 102, an intermediate reinforcing layer 104, and an outer cover layer 106.
Figure 2:
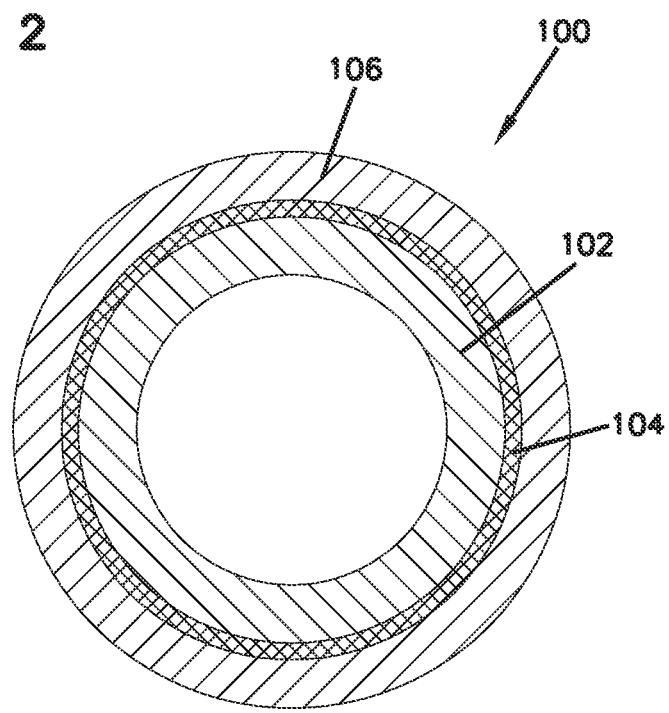
FIG. 2 shows another view of one embodiment of the non-conductive rubber hose 100 comprising three layers: an inner resistive rubber tube layer 102, an intermediate reinforcing layer 104, and an outer cover layer 106, wherein the reinforcing layer 104 is a discontinuous layer such as a textile braid.

A non-conductive rubber hose is provided for use in situations where non-conductivity and high resistivity is desirable. The hose was designed to exhibit lower conductivity compared to conventional EPDM hose, and reduced stiffness compared to prior art non-conductive thermoplastic hose for use in applications such as in hydraulics for boom trucks, and for coolant in plasma cutting tools.

The terminology used herein is for the purpose of describing particular embodiments only and is not intended to be limiting of the disclosure. As used in the description of the embodiments of the disclosure and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 10%, 5%, 1%, 0.5%, or even 0.1% of the specified amount. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this disclosure belongs.

All patents, patent applications and publications referred to herein are incorporated by reference in their entirety. In the event of conflicting terminology, the present specification is controlling.

The term "non-conductive rubber hose" refers to a hose comprising at least one layer prepared from a composition comprising at least one EPDM Polymer, a Highly Resistive filler, a Silane-treated filler, an additional filler and a Filler Activator, wherein the hose passes the dielectric strength test covered in IEC 60974-7 (Torch standard), and wherein the coolant hose passes the insulation resistance and Hipot test to 30 kV peak for 1 minute by exhibiting no dielectric breakdown.

The term "100% Modulus" is also known as Tensile Stress at 100% elongation according to ASTM D412.

The Dielectric strength test, also known as Dielectric test, insulation resistance and Hipot test, Dielectric Withstand Test, or Hipot test, tests for good electrical insulation qualities of the hose. The Hipot test is an abbreviated name for high potential (high voltage) Test and is used to be certain that no current will flow from one point to another. The Hipot test is a nondestructive test that determines the adequacy of electrical insulation for the normally occurring over voltage transient. This is a high voltage test that is applied to devices for a specific period of time to ensure the insulation is not marginal. In some embodiments, a non-conductive hose is provided that wherein the hose passes the dielectric strength test under dielectric strength test covered in IEC 60974-7 (Torch standard) wherein the coolant hose passes the insulation resistance and Hipot test to 30 kV peak for 1 minute by exhibiting no dielectric breakdown.

In one embodiment, a non-conductive rubber hose is provided comprising at least one layer, at least two layers, or at least three layers comprising a non-conductive rubber tube layer prepared from an EPDM rubber tube composition comprising one or more ethylene propylene diene monomer (EPDM) polymers, a resistive filler and a silane-treated filler.

In another embodiment, a non-conductive rubber hose is provided comprising at least three or more layers including an EPDM non-conductive rubber tube, a reinforcing layer, and a cover layer. In some embodiments, a non-conductive rubber hose is provided comprising an EPDM non-conductive rubber tube, a polyester braid reinforcing layer, and a CPE cover layer.

In various embodiments, physical properties including Tensile strength, percent elongation, and 100% modulus are tested in accordance with ASTM D412. Shore A hardness test is performed in accordance with ASTM D2240. Compression set is performed in accordance with ASTM D395.

Compositions

In some embodiments, a non-conductive rubber hose is provided comprising a rubber tube layer prepared from an EPDM rubber tube composition comprising one or more ethylene propylene diene monomer (EPDM) polymers, a resistive filler and a filler activator.

In some embodiments, the EPDM rubber tube composition further comprises a silane-treated filler. In some embodiments, the EPDM rubber tube composition further comprises an additional filler. In some embodiments, the EPDM rubber tube composition further comprises a vulcanizing agent. In some embodiments, the EPDM rubber tube composition further comprises one or more of an antioxidant, zinc activator, plasticizer, acid scavenger, colorant, pigments and/or process aid.

In some embodiments, an EPDM rubber tube material is provided that, following vulcanization, exhibits Tensile Strength of 2000-2500 psi, Percent Elongation 275-350%, 100% Modulus 800-1000 psi, and Shore A hardness of 75-80 pts. Tensile strength and percent elongation were tested in accordance with ASTM 412. The Shore A hardness test was conducted in accordance with ASTM D 2240-95. In some embodiments, a non-conductive EPDM rubber hose is provided that passes a dielectric strength test, wherein the coolant hose is tested for insulation resistance and Hipot to 30 kV peak for 1 minute.

EPDM Polymers

The non-conductive rubber hose comprises an EPDM rubber tube layer prepared from a composition comprising one or more EPDM polymers. In some embodiments, the EPDM rubber tube composition comprises one or more EPDM polymers wherein the total EPDM polymer(s) are a range from 85-115 Phr, 90-110 Phr, or 90-100 Phr, or 25-50 wt %, 30-45 wt %, or 35-40 wt % compared to the total weight of the composition.

In some embodiments, the one or more EPDM polymers include one or more low ethylene EPDM polymers. In some embodiments, the low ethylene EPDM polymers have no more than 60% ethylene, or from 50 to no more than 60 wt % ethylene content by ASTM 3900.

In some embodiments, the EPDM rubber composition comprises one or more low ethylene EPDMs. The low ethylene EPDMs can be selected from, for example without limitation, Vistalon™ 7602 (an ethylene propylene diene terpolymer rubber having about 55 wt % ethylene content by ASTM D3900A, ethylidene norbornene (ENB) content of about 7.5 wt % by ASTM D1646, ExxonMobil Chemical); Vistalon™ 7500 (an ethylene propylene diene terpolymer rubber having about 56 wt % ethylene content by ASTM D3900, and ethylidene norbornene (ENB) content of about 5.7 wt % by ASTM D6047, 82MU, ExxonMobil Chemical); Vistalon™ 8600 (an ethylene propylene diene terpolymer rubber having about 58 wt % ethylene content by ASTM D3900A, and ethylidene norbornene (ENB) content of about 8.9 wt % by ASTM D6047, ExxonMobil Chemical); Vistalon™ 8800 (an ethylene propylene diene terpolymer rubber having about 54 wt % ethylene content by ASTM D3900, and ethylidene norbornene (ENB) content of about 10 wt % by ASTM D6047, ExxonMobil Chemical); Vistalon™ 2504 (an ethylene propylene diene terpolymer rubber having about 57.5 wt % ethylene content by ASTM D3900A, ExxonMobil Chemical); Vistalon™ 2502 (an ethylene propylene diene terpolymer rubber having about 57.5 wt % ethylene content by ASTM D3900A), ExxonMobil Chemical); Nordel™ IP 3670 (a slightly crystalline, ethylene-propylene-diene terpolymer, that contains about 56.7-59.7% by mass ethylene by ASTM D3900, Dow Chemical Company); Nordel™ IP 5565 (an amorphous EPDM that contains about 50% by mass ethylene by ASTM D3900, Dow Chemical Company); Nordel™ IP 4520 (an amorphous, high diene, EPDM that contains about 50% by mass ethylene by ASTM D3900, Dow Chemical Company); Buna® EP G 6850 (an ethylene-propylene-diene rubber (EPDM), amorphous; with ethylidene norbornene as termonomer and about 51% by mass ethylene according to ASTM D 3900, Lanxess Corporation); or Royalene® 563 (an ethylene-propylene ethylidene norbornene rubber that contains about 57.3% ethylene, Lion Copolymer Geismar, LLC). In some embodiments, the EPDM rubber tube layer composition comprises a low ethylene EPDM polymer at 65-85 Phr, or 70-80 Phr.

In some embodiments, the one or more EPDM polymers includes one or more high ethylene EPDM polymers of at least 69 wt % ethylene content, or 69-78 wt % ethylene content by ASTM 3900. In some embodiments, the EPDM rubber tube layer is prepared from a composition comprising one or more high ethylene EPDM polymers, are selected from without limitation from, for example, Vistalon™ 7001 (an ethylene propylene diene terpolymer rubber having about 73 wt % ethylene content by ASTM D3900B, ethylidene norbornene (ENB) content of about 5 wt % by ASTM D6047, and Mooney viscosity of 60 MU by ASTM1646, ExxonMobil Chemical); Vistalon™5601 (an ethylene propylene diene terpolymer rubber having about 69 wt % ethylene content by ASTM D3900B, ethylidene norbornene (ENB) content of about 5 wt % by ASTM D6047, and Mooney viscosity of 72 MU by ASTM1646, ExxonMobil Chemical); Vistalon™5702 (an ethylene propylene diene terpolymer rubber having about 71 wt % ethylene content by ASTM D3900B, ethylidene norbornene (ENB) content of about 5.5 wt % by ASTM D6047, and Mooney viscosity of 90 MU by ASTM1646, ExxonMobil Chemical); and BUNA EP G 6470, (ethylene-propylene-diene rubber EPDM with ethylidene norbornene (ENB) as diene, about 70% ethylene content by ASTM D3900, ethylidene norbornene (ENB) content of about 4.7 wt % by ASTM D6047, and Mooney viscosity of about 59 MU by ASTM D1646, Brenntag). In some embodiments, the EPDM rubber tube layer composition comprises 15-35 Phr, or 20-30 Phr high ethylene EPDM polymer(s).

In some embodiments, the EPDM rubber tube composition comprises at least one low ethylene EPDM polymer(s) and at least one high ethylene EPDM polymer(s) in a weight ratio of low ethylene to high ethylene EPDM polymers of about 10:1-1:10, 10:1-1:1, 5:1-2:1, or about 3:1.

In some embodiments, the one or more EPDM polymer(s) are selected with a high diene content of greater than 5 wt % to 10 wt % ethylidene norbornene (ENB) content by ASTM 6047. In some embodiments, the one or more EPDM polymer(s) are selected with a medium diene content of from 2.8 to 5 wt % ethylidene norbornene (ENB) content by ASTM 6047. In some embodiments, the one or more EPDM polymer(s) are selected from one or more, or two or more EPDM polymers exhibiting a medium Mooney viscosity selected from 52 to 72, or 60 to 65 MU by ASTM D1646.

Resistive Filler

The non-conductive rubber tube layer is prepared from a composition comprising one or more resistive fillers. In some embodiments, the resistive filler comprises a low surface area highly resistive carbon black. In some embodiments, the resistive filler is a pelleted, semi-reinforcing carbon black comprising a low surface area and medium to high structure, as defined herein.

In some embodiments, the resistive filler is a carbon black filler exhibiting low specific surface area and medium-high structure. Surface area measurements can be determined by CTAB (cetyltrimethylammonium bromide absorption) (ASTM D3765), Iodine adsorption (ASTM D1510), or Nitrogen number (ASTM D3037). In some embodiments, the resistive filler is a carbon black with low surface area determined by Iodine adsorption test result (mg/g) of from 16-27 mg/g, or no more than 20 mg/g by ASTM D1510.

In some embodiments, the resistive filler is a carbon black filler exhibiting medium-high structure. The amount of structure may be determined by Oil Absorption Number (OAN) using DBP (dibutylphthalate) or paraffin oil by ASTM D2414 or ASTM D3493. Higher levels of DBT correspond to higher structure. In some embodiments, the resistive filler is a carbon black filler exhibiting medium high structure from 92-120 DBP cm$^3$/100 g, or from 95-100 DBP cm$^3$/100 g.

In some embodiments, the resistive filler having is a pelleted carbon black selected from SPHERON® 6400, SPHERON® 6400A, SPHERON® 6000A, or SPHERON® 5000A carbon black (Cabot Corp., Alpharetta, Ga., USA).

In some embodiments, the resistive filler having is a carbon black exhibits both low surface area and medium high structure from 92-120 DBP cm3/100 g, is selected from SPHERON® 6400, SPHERON® 6400A, SPHERON® 6000A, or SPHERON® 5000A carbon black (Cabot Corp., Alpharetta, Ga., USA). In a specific embodiment, the resistive filler is selected from SPHERON® 6400, or SPHERON® 6400A pelleted carbon black (DBP 95-100 cm$^3$/100 g). High-resistivity carbon black use is described in U.S. Pat. Nos. 6,372,349 and 4,277,673, each of which is incorporated herein by reference.

Highly resistive carbon black filler having both low surface area and medium high structure, as defined above, helps impart higher modulus and low conductivity/high resistivity to the non-conductive rubber tube. In some embodiments, the non-conductive EPDM rubber tube layer is prepared from a composition comprising 20-70 Phr, 30-60 Phr, or 35-45 Phr resistive filler. Alternatively, the non-conductive EPDM rubber tube layer is prepared from a composition comprising 5-30 wt %, 10-20 wt % or 12-17 wt % resistive filler.

Filler Activator

In some embodiments, the non-conductive rubber tube layer is prepared from a composition comprising a filler activator. The filler activator is used to form a chemical bond between the rubber and the silane treated filler containing hydroxyl groups. The filler activator is selected from a vinyl silane, or polysiloxane containing vinyl-, propyl- and ethoxy groups (e.g. DEOLINK VO, DOG Deutsche Oelfabrik). Compared to compounds without silanes the electrical properties are improved. The vinyl protects against humidity and water uptake which is essential to high resistivity and desired low conductivity of the non-conductive rubber hose. The filler activator is present in from 0.1-10, 0.5-5, or 0.75-1.5 Phr compared to total EPDM polymer(s). Alternatively, the filler activator is present in the composition at from 0.05-5 wt %, 0.1-3 wt % or 0.2-1 wt %.

In some embodiments, the weight ratio of resistive filler to filler activator in the rubber tube composition is helpful for achieving the desirable non-conductive rubber hose. In some embodiments, the weight ratio of resistive filler to filler activator is from 100:1 to about 5:1, from about 60:1 to 10:1, or about 40:1.

Silane-Treated Filler

In some embodiments, the non-conductive rubber tube layer is prepared from a composition comprising a silane-treated filler. The silane-treated filler may be selected from a silane-treated Kaolin clay filler. The silane-treated Kaolin clay filler adds reinforcement, e.g., adds tensile strength, without increasing conductivity in the non-conductive rubber layer. However, use of too much silane-treated Kaolin clay filler compared to resistive or additional fillers results in an uneven, rough appearance in the hose layer. Therefore, the non-conductive EPDM rubber tube layer composition comprises a silane-treated filler in an amount from 10-30 Phr, 15-25 Phr, or 18-22 Phr compared to the total EPDM polymer(s). Alternatively, the composition comprises from 1-15 wt %, 2-12 wt % or 5-10 wt % silane-treated filler. In some embodiments, the weight ratio of silane-treated filler to additional filler in the EPDM rubber tube composition is important for achieving the non-conductive rubber hose. In some embodiments, the weight ratio of silane-treated filler to additional filler is from about 1:10-10:1, 1:5-5:1, or about 2:5-3:5.

Additional Filler

In some embodiments, the non-conductive rubber tube is prepared from a composition comprising a resistive filler and an additional filler. In some embodiments, the additional filler is selected from calcium carbonate, kaolin clay, precipitated silica, talc, barite, wollanstonite, mica, precipitated silicates, fumed silica, and diatomite. In some embodiments, the additional filler is an isometric filler such as calcium carbonate, that may be approximately round, cubic, or blocky in shape are considered to have a low aspect ratio, or less than about 5:1 aspect ratio. The aspect ratio being defined as the ratio of the length to the width of the particle. In some embodiments, the additional filler has a high aspect ratio equal to or greater than about 5:1, which may be, for example, platy, acicular (needle-shaped), or fibrous in shape. In some embodiments, the additional filler is selected from a platy filler such as kaolin clay, talc or mica. In some embodiments, the additional filler is a kaolin clay which may or may not be calcined by thermal treatment. In some embodiments, the kaolin clay is a hard kaolin clay or a soft kaolin clay. In some embodiments, the additional filler is a hard kaolin clay, e.g. LGB1 (Imerys Ceramics). In some embodiments, the additional filler is present at from 20-80 Phr, 30-70 Phr, or 40-60 Phr, or 5-35 wt %, 10-30 wt %, or 15-25 wt % compared to the total weight of the EPDM rubber composition.

Peroxide Donor Curative

The EPDM non-conductive rubber tube is prepared from a composition comprising a peroxide donor curative. In some embodiments, the peroxide donor curative comprises one or more vulcanizing agent organic peroxides selected from dicumyl peroxide and t-butyl cumyl peroxide, for example, mixture of the para and meta isomers of an alpha, alpha'-bis(tert-butylperoxy)diisopropylbenzene (e.g., VULCUP® 40KE, GEO Specialty Chemicals) which is a benzoyl peroxide crosslinking agent.

Zinc Activator

In one embodiment, the EPDM non-conductive rubber tube is prepared from a composition comprising a zinc activator, for example a ZnO such as a powdered zinc oxide, e.g., KADOX® 930, Horsehead Corporation, Monaca, Pa. The zinc activator is present in the composition at from 1-10 Phr, 2-8 Phr, or 3-7 Phr. Alternatively, the zinc activator is present in the composition at from 0.1-5 wt %, 0.5-4 wt % or 1-3 wt % compared to the total weight of the composition.

Antioxidant

In one embodiment, the EPDM non-conductive rubber tube is prepared from a composition comprising an antioxidant. Examples of antioxidants used in some embodiments include, for instance, Antioxidant DQ (Polymerized 2,2,4-trimethyl-1,2-dihydroquinone, Akrochem Corporation, Akron Ohio), Agerite MA™ (2,2,4-trimethyl-1,2-dihydroquinolone polymer), or other hindered phenols, such as IRGANOX™ 1010, Ciba Specialty, Pentaerythritol Tetrakis (3-(3,5-di-tert-butyl-4-hydroxyphenyl)propionate)). A phosphite such as or Irgafos® 168 (tris (2,4-di-tert-butylphenyl) phosphite, Ciba), may also be included. In some embodiments, the antioxidant is present at about 0.1-5 Phr, 0.5-3 Phr, or 1-2 Phr of the EPDM rubber composition. In other aspects of an embodiment, the antioxidant is present at about 0.05 wt % to about 3 wt %; 0.1 wt % to about 1.5 wt; or from about 0.1 wt % to about 1.0 wt % by weight of the composition.

Plasticizer

In some embodiments, the composition comprises one or more plasticizers. Example plasticizers used in some embodiments include polymer based types, such as polybutene, or paraffinic oils such as Sunpar 2280 DLC-A™ (paraffinic process oil silicon dioxide blend plasticizer, Natrochem Inc.), Drakeol® mineral oil (white mineral oil, Calumet Penreco; Dallas, Tex.), PD-23 White Oil (white mineral oil, Sonneborn, Inc.; Tarrytown, N.Y.), DOTP (bis (2-ethylhexyl) terephthalate, e.g. Exxon Eastman 168, Eastman DBT, BASF Platinol 79P), DIDP (diisodecyl phthalate, e.g., Exxon Jayflex DIDP, Jayflex DTDP, BASF Platinol N, Nanya DIDP), TO™ (tri-n-octyl trimellitate, e.g., from Exxon Jayflex TIN™, BASF Platinol TO™, Nanya TO™) and DOP (Diethylhexyl phthalate; Dioctyl phthalate, e.g., BASF Platinol® DOP, BASF Platinol 79, Eastman DOP, or Polynt DOP).

In some embodiments, the composition comprises plasticizer at 10-30 Phr, or 15-25 Phr, or from about 1 wt % to about 20 wt %; about 3 wt % to about 15 wt %; about 5 wt % to about 10 wt % by weight of the composition.

In one embodiment, a non-conductive rubber hose is provided comprising a non-conductive rubber tube layer prepared from an EPDM composition according to Table 1.

TABLE 1

EPDM Composition.

| Component | Description/Example | Parts per hundred (Phr) |
|---|---|---|
| EPDM Polymer | Ethylene Propylene Diene Terpolymer Rubber(s) | 90-100 |
| Zinc Activator | Zinc oxide | 3-7 |
| Antioxidant | Polymerized 2,2,4-trimethyl-1,2-dihydroquinone | 1-2 |
| Plasticizer | Paraffinic process oil | 10-30 |
| Silane-treated filler | Silane-treated Kaolin clay filler | 15-25 |
| Resistive filler | Highly resistive Carbon Black | 30-60 |
| Filler Activator | Vinyl Silane | 0.5-5 |
| Acid Scavenger | Magnesium Aluminum Hydroxide Carbonate | 3-7 |
| Process Aid | Paraffin Wax | 5-15 |
| Peroxide donor curative | Blend of peroxide and cross-linking coagents, e.g., bisperoxide supported on Burgess KE Clay, para- and meta-isomers of an a,a'-bis(tert-butylperoxy) diisopropyl-benzene | 5-10 |
| Additional filler | Standard Kaolin Clay | 20-80 |

Acid Scavenger

In some embodiments, the non-conductive EPDM rubber tube is prepared from a composition comprising one or more process aids that include an acid scavenger. The acid scavenger may be selected from magnesium oxide, magnesium aluminum hydroxide carbonate at from 1-10 Pph, 3-7 Pph in the composition.

Process Aid

In some embodiments, the non-conductive EPDM rubber tube is prepared from a composition comprising one or more process aids. The process aids may be selected from paraffin waxes, stearic acid, calcium stearate, oil treated powder, and/or zinc diacrylate. In some embodiments, one or more process aids is employed at 5-15 Phr in the EPDM rubber composition.

Other additives such as ultraviolet stabilizers, cling additives, light stabilizers (e.g. hindered amines), thermal stabilizers, release agents, tackifiers, crosslinking agents (e.g. peroxides or silanes), flame retardants (e.g., magnesium dioxide), colorants or pigments may be employed to the extent they do not interfere with desired properties of the compositions.

Reinforcement Layer

In some embodiments, a non-conductive rubber hose is provided comprising a CPE rubber layer and a reinforcement layer. In some embodiments, the reinforcement layer is a discontinuous layer comprising interstices in the layer, for example, comprising a textile braid, mesh, or parallel longitudinal members. In one embodiment, the reinforcement layer 104 is disposed between an inner EPDM rubber tube 102 and an outer cover layer 106, as shown in FIG. 1. In some embodiments, the reinforcement layer is a textile braid. Examples of suitable textiles for the reinforcement layer 104 include aramid, polyester braid, nylon, cotton, rayon. In some embodiments, the cover layer 106 and the rubber hose layer 102, migrate through the interstices of the textile braid in the reinforcement layer 104 and vulcanize together.

Cover Layer

In some embodiments, a non-conductive rubber hose is provided comprising a CPE rubber layer and an outer cover layer. In one embodiment, as shown in FIG. 1, an inner EPDM rubber tube 102, reinforcement layer 104, and an outer cover layer 106 is employed. In some embodiments, the non-conductive rubber hose comprises an outer cover layer prepared from a composition comprising a CPE (chlorinated polyethylene) polymer. In some embodiments, the CPE cover layer is prepared from a CPE composition comprising one or more CPE polymers from 90-100 Pph. In another embodiment, the CPE composition comprises about 20-50 wt %, or about 25-35 wt % of one or more CPE polymers. In some embodiments, the CPE composition comprises CPE polymer is selected from DOW Chemical TYRIN®, Lianda WEIPREN®, or S&E Specialty Polymers. In some embodiments, the CPE polymer is selected from 25% to 42% chlorine, 30-40% chlorine, or about 36% chlorine.

The CPE composition may further comprise one or more fillers at from about 100-200 Pph, one or more plasticizers at from 20-80 Pph, antioxidant at 1-20 Pph, peroxide donor curative at from 1-15 Pph, or 5-10 Pph, and optionally one or more pigments, colorants, process aids, and/or flame retardants.

In some embodiments, a non-conductive hose is provided comprising at least two layers including an EPDM rubber tube layer and a CPE cover layer. In some embodiments, a non-conductive hose is provided comprising at least three layers including an EPDM rubber tube layer, a reinforcement layer, and a CPE cover layer.

Sizes

A non-conductive rubber hose is provided which may comprise one or more, two or more, three or more layers, four or more layers, or five or more layers. In some embodiments, a hose is provided having inner diameter (I.D.)/outer diameter (O.D.) of 0.25 in/0.50 in, 0.38 in/0.62 in, 0.5 in/0.78 in, 0.63 in/0.91 in, or 0.75 in/1.03 in.

Method of Making Non-Conductive Rubber Hose

In some embodiments, a method of making a hose according to FIG. 1 is provided, the method comprising blending a first composition comprising an ethylene propylene diene monomer (EPDM), a resistive filler, and a silane-coated filler and extruding the first composition onto a mandrel to form an EPDM layer 102; applying a reinforcement layer over the EPDM tube layer to form reinforcement layer 104; extruding a cover layer over the reinforcement layer to form a cover layer 106 in a green hose; vulcanizing the green hose; and expelling the hose from the mandrel. In some embodiments the extrusion comprises shearing and heating. In some embodiments, the vulcanizing occurs at 300-330° F.

Figure 3:
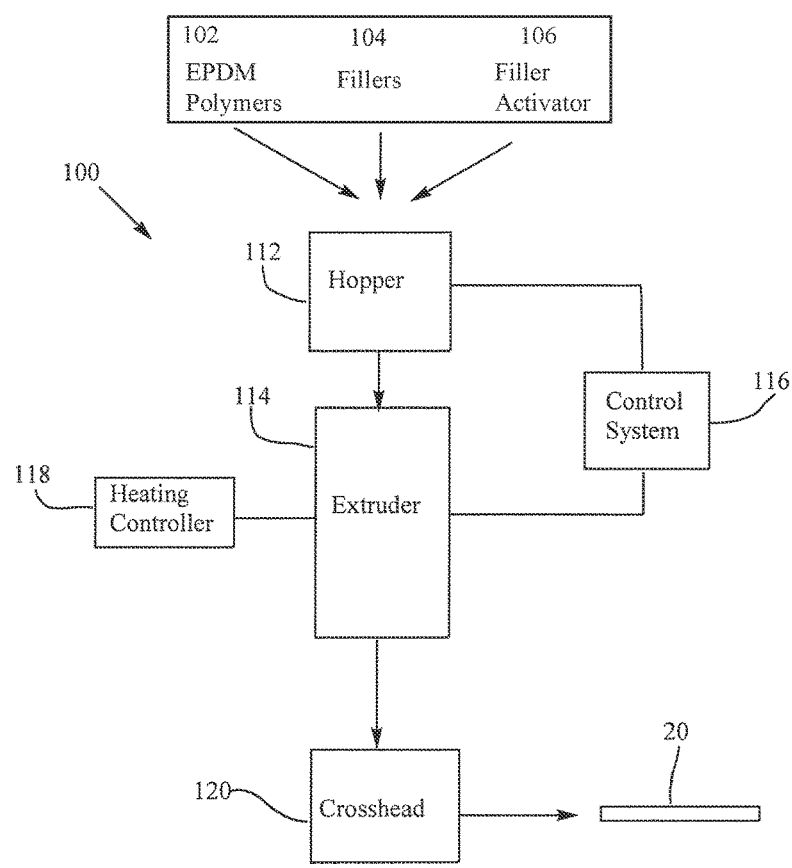
FIG. 3 shows a schematic drawing of an extrusion system used to make a non-conductive rubber hose according to an embodiment.

An exemplary method for making a hose according to the disclosure is illustrated in FIG. 3. Hose 20 comprised of a layer formed from the composition may be manufactured on an extrusion system 100 as shown in FIG. 3. The extrusion system 100 may include, among other components, a hopper 112, an extruder 114 (e.g., an auger or screw type extruder), a control system 116, a heating controller 118 and a crosshead 120. The components (EPDM polymer 102, fillers 104, filler activator 106) used to make the hose 20 can be metered into a hopper 112 controlled by the control system 116. The components 102, 104, 106 may be in pellet form or any other suitable form. The components 102, 104, 106 can be at least partially mixed in the hopper 112 and then fed into the extruder 114 where the components 102, 104, 106 are further mixed and heated with heat supplied by one or more heating elements of the extruder controlled by the heating controller 118. The components 102, 104, 106 may be under pressure prior to or when exiting the extruder 114 into the cross head 120. The cross head 120 may include a tip and a die (not shown) to form the body of the hose 20. After the extrusion process the hose 20 may be cooled (e.g., by using a cooling bath) and gathered on a take-up reel. Mixing the components 102, 104, 106 and extruding them directly into hose 20 without additional heating steps may be beneficial because an additional heating step and therefore degradation of the composition can be avoided. Alternatively it may be desirable in some circumstances to mix and extrude the components 102, 104, 106 to form pellets comprising the composition that can then be formed into hose 20 at a later time using the extrusion system 100. In certain examples, the composition can be a co-polymer, alloy or blend.

EXAMPLES

Example 1. EPDM Rubber Composition

An EPDM rubber composition is prepared according to Table 2 by the method of Example 3.

TABLE 2

EPDM rubber test composition

| Ingredients | Pph | wt % | Function: |
|---|---|---|---|
| VISTALON 7001 | 25.00 | 9.58 | EPDM Polymer |
| KADOX 930 (ZNO) | 5.00 | 1.92 | Zinc Activator |
| ANTIOXIDANT DQ | 1.50 | 0.57 | Antioxidant |
| LUBSPAR 2280 (SUNPAR 2280) | 20.00 | 7.66 | Plasticizer |
| VISTALON 7602 | 75.00 | 28.74 | EPDM Polymer |
| PV-BOND 931V | 20.00 | 7.66 | Silane treated filler Kaolin clay filler |

TABLE 2-continued

EPDM rubber test composition

| Ingredients | Pph | wt % | Function: |
|---|---|---|---|
| SPHERON 6400 | 40.00 | 15.33 | Resistive filler highly resistive carbon black |
| DEOLINK VO (vinyl silane) | 1.00 | 0.38 | Filler activator vinyl silane |
| DHT-4A2 | 5 | 1.92 | Acid scavenger |
| PARAFFIN WAX 1231 | 10 | 3.83 | Process aid |
| VUL-CUP 40KE | 8.5 | 3.26 | Peroxide donor curative |
| LGB-1 | 50 | 19.16 | Additional filler standard kaolin clay |
| Totals: | 261.00 | 100.00 | |

The EPDM rubber test composition met the following requirements following processing and cure as shown in Table 3. Tensile strength and percent elongation were tested in accordance with ASTM 412. The Shore A hardness test was conducted in accordance with ASTM D 2240-95.

TABLE 3

Physical Properties of Rubber composition following cure

| Property | Value |
|---|---|
| Tensile strength (psi) | 2000-2500 |
| Percent Elongation (%) | 275-350 |
| 100% Modulus (psi) | 800-1000 |
| Shore A Hardness (pts) | 75-80 |

Example 2. CPE Cover Layer Composition

A CPE cover composition was prepared according to the formulation shown in Table 4, and used to prepare the hose of Example 3.

TABLE 4

Composition for CPE Cover Layer.

| Ingredients | PPH | Wt % | Function |
|---|---|---|---|
| CPE 36% Cl MED VISC | 100 | 30.21 | CPE polymer |
| HI-SIL 243 LD | 10 | 3.02 | silicon dioxide, amorphous filler |
| NULOK 390 | 140 | 42.3 | treated kaolin clay filler |
| DOP | 25 | 7.55 | Dioctyl phthalate plasticizer |
| TOTM-CA | 25 | 7.55 | Trioctyl trimellitate plasticizer |
| E-1045 BLUE EPMB | 2.5 | 0.76 | Colorant |
| ANTIOXIDANT DQ | 0.5 | 0.15 | Antioxidant |
| MAGCHEM HSA-10 | 10 | 3.02 | Magnesium oxide Acid scavenger |
| REDIMIX 9595 | 2 | 0.6 | Process aid Oil treated powder |
| VUL-CUP 40KE | 6 | 1.8 | Peroxide donor curative |
| TIONA AT1 | 10 | 3.02 | pigment |
| Totals: | 331 | 100 | |

Following mixing and processing, the CPE cover composition met the material requirements shown in Table 5.

TABLE 5

Physical Properties of CPE composition following cure.

| Test | Standard | Test Parameters |
|---|---|---|
| Tensile (psi) | 1400 (min) | Cure(slab) 30 min @320° F. |
| Elongation (%) | 180 (min) | |
| Modulus (psi) 100% | 550 (min) | |
| Hardness (Shore A) | 78 (±5) | |
| Specific Gravity | 158 (±.03) | |

Example 3. Preparation and Assessment of Rubber Hose

The composition of Examples 1 or 2 were formulated by mixing with a Banbury rubber mixer, milling the rubber and applying to seal dimensional mold followed by curing the article.

In a first example, a Banbury™ mixer (Farrel Corporation) was used to mix the different rubber formulations according to ASTM D 3182-07. First, the polymer was added first into the mixer in a 30 second mastication cycle at a temperature selected from 150° F. Second, fillers and liquids were added in a 120 second mix cycle at 230° F. Then, process aids, and vulcanizing agents, were added in a 120 second mix cycle at 240° F. Fourth, the composition undergoes a fourth mix cycle for 120 seconds at 250° F. Then the master batch rubber is inserted into the mixer with the curatives and mixed for 90 seconds at 250° F., followed by a final mix for 120 seconds at 180° C.

After the rubber drops from the mixer, the rubber was manually applied to a dual-roll mill according to ASTM B 947. The dual roller mill stage sheets and cools the mixed formulation. The cure kinetics of the rubber formulations were assessed according to ASTM D 2084 (cure study). Based on T90 values from the cure study, the sheeted material from the dual roller mill was applied to a seal dimensional mold, followed by curing the article.

Physical properties including Tensile strength, percent elongation, 100% modulus, and other physical properties were tested in accordance with ASTM D412. Shore A hardness test is performed in accordance with ASTM D2240. Compression set is performed in accordance with ASTM D395.

Example 4. Three-Layer Non-Conductive Hose

A three layer a hose according to FIG. 1 was prepared by blending a the EPDM rubber composition according to Example 1, Table 2 comprising an ethylene propylene diene monomer (EPDM), a resistive filler, and a silane-coated filler and extruding the rubber composition onto a mandrel to form an EPDM layer 102; applying a polyester braid reinforcement layer over the EPDM tube layer to form reinforcement layer 104; blending and extruding a CPE cover layer according to Example 2, Table 4 over the reinforcement layer to form a cover layer 106 in a green hose; vulcanizing the green hose at about 320° F.; and expelling the hose from the mandrel. The hose was tested according to wherein the hose passes the dielectric strength test covered in IEC 60974-7 (Torch standard). The coolant hose passes the insulation resistance and Hipot test to 30 kV peak for 1 minute by exhibiting no dielectric breakdown. Burst testing was also performed on two sizes of hose: on the −8: 1,202 psi, 1,314 psi, 1,221 psi; and on the −6: 1,521 psi burst pressures were exhibited.

Example 5. Pin-Pricking Under Water Test

In order to help determine acceptable integrity of the hose and core tube are free from product defects, a pin-pricking under water test was performed with the hose being held underwater and pressurized to 50 psi according to the following protocol.

A. Inspect pin-pricking wheels at set-up. Check color coding on wheels to assure proper wheel is being used in the pin tool. If wheels are not color coded, or they have dull, missing or bent pins, send wheels to Tool Room for rework/repair.

1. Inspect pin length based on pin-pricker chart below (Ref MI-014) by using the bottom of a height gage or calipers. Send to Tool Room if out of tolerance (+/−0.005).

| Pin Pricker Wheel Color Codes & Lengths | | |
|---|---|---|
| P-1 | RED | 0.060 |
| P-2 | WHITE | 0.035 |
| P-3 | BLUE | 0.025 |
| P-4 | GREEN | 0.100 |
| P-5 | BLACK | 0.210 |
| P-6 | BROWN | 0.080 |
| P-7 | YELLOW | 0.070 |
| P-8 | ORANGE | 0.075 |
| P-9 | SILVER | 0.125 |
| P-10 | GOLD | 0.045 |

2. Adjust wheel to hose pressure and/or alignment of hose.

B. Cut and check a 2 foot sample of pin-pricked hose.

1. Thread appropriate air connection fitting onto hose.

2. Crimp over the other end and tape securely with nylon tape. Use cable grips/plugs on −12 and −16 hose as crimping end is difficult. Insert hose into end of plug with ID that matches the OD of the hose. Plugs are labeled with OD range they can handle. Insert hose into end and turn the cap (right hand thread) until it is sealed around hose.

3. Connect to air support hose with air valve off.

4. Submerge hose in water and slowly (carefully) open the air valve to 50 psi.

5. Look for continuous rows of air bubbles. Air bubbles must be evident from at least 50% of the holes per row and at least two of the three rows. If not, make adjustments and repeat Step B.

6. Once step 5 is satisfied, cut and peel back the sheath and braid on an 18" sample to examine the core tube. The core tube must be free from any marks or imperfections due to the pin pricking. If the core tube is damaged, the product is rejected.

Inventive hose according to Example 4 passed the underwater test at 50 psi.

The embodiments described in one aspect of the present disclosure are not limited to the aspect described. The embodiments may also be applied to a different aspect of the disclosure as long as the embodiments do not prevent these aspects of the disclosure from operating for its intended purpose.

REFERENCES CITED

U.S. Pat. No. 4,277,673
U.S. Pat. No. 6,372,349
US 2007/0244244
EP 1090743 A2

We claim:

1. A method of making a non-conductive rubber hose comprising
blending a first composition comprising an ethylene propylene diene monomer (EPDM) polymer, wherein the EPDM polymer comprises low ethylene EPDM polymer having no more than 60 wt % ethylene by ASTM 3900 and high ethylene EPDM polymer having at least 69 wt % ethylene by ASTM 3900, in a weight ratio of about 10:1 to about 1:1, an electrically-resistive filler, and a silane-treated filler;
extruding the first composition onto a mandrel to form an EPDM rubber tube layer;
applying a textile braid over the EPDM tube layer to form reinforcement layer;
extruding a second composition over the reinforcement layer to form a cover layer in a green hose;
vulcanizing the green hose; and
expelling the hose from the mandrel.

2. The method according to claim 1, wherein the first composition comprises a low ethylene EPDM polymer and a high ethylene EPDM polymer in a weight ratio of about 5:1 to about 2:1.

3. The method according to claim 1, wherein the non-conductive rubber hose passes the dielectric strength test according to IEC 60974-7 (torch standard), and wherein the hose passes the insulation resistance and Hipot test to 30 kV peak for 1 minute.

4. The method according to claim 1, wherein the second composition comprises one or more chloropolyethylene (CPE) polymers.

5. The method according to claim 4, wherein the second composition comprises about 20-50 wt % of the one or more chloropolyethylene (CPE) polymers.

6. The method according to claim 1, wherein the first composition further comprises a filler activator.

7. The method of claim 6, wherein the filler activator is selected from the group consisting of a vinyl silane and a polysiloxane containing vinyl-, propyl- and ethoxy groups.

8. The method according to claim 6, wherein the first composition comprises a weight ratio of the resistive filler to the filler activator from about 100:1 to about 5:1.

9. The method according to claim 6, wherein the first composition further comprises an additional filler.

10. The method according to claim 9, wherein the weight ratio of silane-treated filler to additional filler is from about 1:10 to about 10:1.

11. The method according to claim 1, wherein the first composition further comprises each of a peroxide donor curative, a plasticizer, and an antioxidant.

12. The method according to claim 11, wherein the first composition further comprises one or more of the group consisting of process aid, acid scavenger, paraffin wax, and zinc activator.

13. The rubber hose according to claim 1, wherein the resistive filler is a carbon black filler having low surface area of from about 16-27 mg/g, or no more than 20 mg/g Iodine adsorption by ASTM D 1510.

14. The rubber hose according to claim 13, wherein the resistive filler has medium to high structure of from 92-120 DBP cm3/100 g as determined by absorption of dibutylphthalate (DBP) by ASTM 2414-90.

15. The method according to claim 1, wherein the reinforcement layer is a textile braid, wherein the textile is selected from the group consisting of aramid, rayon, nylon, cotton, and polyester braid.

16. The method according to claim 1, wherein the first composition comprises
the EPDM polymer at 90-100 Pph;
the resistive filler at 30-60 Phr;
a filler activator at 0.1-10 Phr;
the silane-treated filler at 10-30 Phr; and
an additional filler at 20-80 Phr.

17. The method according to claim 1, wherein the cured first composition exhibits one or more physical parameters selected from the group consisting of
Tensile strength of 2000-2500 psi when tested according to ASTM D412;
Percent elongation of 275-350% when tested according to ASTM D412;
100% Modulus of from 800-1000 psi when tested according to ASTM D412;
Shore A Hardness of from 75-80 pts when tested according to ASTM D2240; and
Minimum burst strength of 1200 psi or higher.

* * * * *